United States Patent
Reihl et al.

(10) Patent No.: US 7,896,430 B2
(45) Date of Patent: Mar. 1, 2011

(54) VEHICLE ROOF

(75) Inventors: Peter Reihl, Starnberg (DE); Thomas Dintner, Munich (DE); Adam Wagner, Germering (DE); Reinhard Filsinger, Plochingen (DE); Stephan Kraus, Schwifting (DE)

(73) Assignee: Webasto AG, Stockdorf (DE)

( * ) Notice: Subject to any disclaimer, the term of this patent is extended or adjusted under 35 U.S.C. 154(b) by 0 days.

(21) Appl. No.: 12/279,657

(22) PCT Filed: Feb. 8, 2007

(86) PCT No.: PCT/DE2007/000254
§ 371 (c)(1),
(2), (4) Date: Nov. 21, 2008

(87) PCT Pub. No.: WO2007/093155
PCT Pub. Date: Aug. 23, 2007

(65) Prior Publication Data
US 2009/0079226 A1    Mar. 26, 2009

(30) Foreign Application Priority Data

Feb. 17, 2006 (DE) .......................... 10 2006 007 815

(51) Int. Cl.
*B60J 7/053* (2006.01)
*B60J 7/06* (2006.01)
(52) U.S. Cl. .......................... 296/219; 296/222; 296/223
(58) Field of Classification Search .................. 296/219, 296/223, 222
See application file for complete search history.

(56) References Cited

U.S. PATENT DOCUMENTS

| 1,718,183 | A | * | 6/1929 | Smith ........................ 160/368.1 |
| 3,720,440 | A | | 3/1973 | Podolan |
| 4,741,572 | A | * | 5/1988 | Bauhof ........................ 296/221 |
| 5,421,635 | A | * | 6/1995 | Reinsch et al. .......... 296/220.01 |

(Continued)

FOREIGN PATENT DOCUMENTS

DE    3925150    2/1990

(Continued)

OTHER PUBLICATIONS

International Search Report dated Jul. 19, 2007.

*Primary Examiner* — Dennis H Pedder
(74) *Attorney, Agent, or Firm* — Fitch, Even, Tabin & Flannery; John M. Naber

(57) ABSTRACT

The present invention relates to a vehicle roof with a roof opening (12) and with a roof section (10) having a roof tip (16) pointing to the front of the vehicle (14) and a roof end (18) pointing to the rear of the vehicle (12). The roof section (10) can be moved along guide tracks (23), which run on both sides of the roof opening, out of a closed position, which closes the roof opening (2), into an open position, which at least partially opens up the roof opening. In order to optimize the vehicle roof to the effect that, in the partially open position and/or during the opening movement while under way, only very low travelling noises, if any at all, are produced and the highest requirements with regard to the sealing in the closed position are met, the opening movement from the closed position of the roof section begins with a movement of the roof end (18) into a lowered position below the roof opening (2).

8 Claims, 3 Drawing Sheets

U.S. PATENT DOCUMENTS

| | | | |
|---|---|---|---|
| 5,944,378 A | 8/1999 | Mather | |
| 6,428,090 B1 * | 8/2002 | Reinsch | 296/216.08 |
| 2003/0038502 A1 * | 2/2003 | Marold et al. | 296/107.18 |

FOREIGN PATENT DOCUMENTS

| | | |
|---|---|---|
| DE | 4009470 | 11/1990 |
| DE | 10138370 | 2/2003 |
| DE | 10320538 | 12/2004 |
| DE | 102004020757 | 12/2005 |
| EP | 0353695 | 2/1990 |
| EP | 0591644 | 4/1994 |
| FR | 2766429 | 1/1999 |
| WO | WO 03/086798 | 10/2003 |

* cited by examiner

VEHICLE ROOF

This application is a 35 U.S.C. §371 National Stage entry of PCT/DE2007/000254, filed Feb. 8, 2007, which claims priority from German Patent Application No.: DE 10 2006 007 815.2, filed Feb. 17, 2006, the contents of which are herein incorporated by reference.

The present invention relates to the construction of openable vehicle roofs, in particular for passenger motor vehicles which can be converted into open vehicles (convertibles). A multiplicity of constructions permitting partial or complete opening of the vehicle roof are known in general in this field.

Within the context of the present invention, the opening of a vehicle roof is to be understood basically as meaning the extensive opening up of a roof opening which usually extends between the side longitudinal members (side struts) of the roof or the side windows and a region between the windshield and rear. In the open state, said vehicle roofs have an opening which goes considerably beyond the opening which can be opened up by a conventional vehicle sliding roof (for example described in German patent DE 37 15 268 C2).

U.S. Pat. No. 6,830,284 discloses a three-part roof, the stiff roof parts of which are first of all displaced with respect to one another in order to open up the roof opening and thus subsequently deposit it together in a rear compartment.

U.S. Pat. No. 6,305,734 reveals a folding roof which can first of all be displaced into a semi-open position, in which it falls into folds at the back. From the semi-open position, the folding roof can then be displaced into a fully open position and can subsequently be stowed in the rear of the vehicle.

German patent application DE 197 31 330 A1 describes a convertible top for a vehicle, wherein a rear roof frame is articulated in a pivotable manner via an articulated connection. Side struts in which a sliding folding cover is guided and can be displaced in the longitudinal direction of the vehicle are arranged between the rear roof frame and the crossmember of the windshield. After complete opening of the sliding folding cover, the latter can be pivoted via articulated rods into a storage compartment at the rear of the vehicle; subsequently, the side struts can be pivoted by means of hinges arranged in the region of the B pillars so as to fully open up the central roof region.

The invention relates to a vehicle roof according to the precharacterizing clause of patent claim 1.

Such a vehicle roof of the type in question is described in German patent DE 101 04 523 C1. In the case of this vehicle roof, a roof covering is provided, the roof covering being referred to as an openable roof element and being able to be pushed together from a position (subsequently: closed position) completely covering and closing the vehicle roof (or a roof opening provided in the vehicle roof) to the rear into a roof cassette. In this case, the roof covering opens up the roof opening successively until it is fully opened (this state is also referred to below as the open position). The roof cassette is pivotable to the rear and downward about an axis lying transversely with respect to the longitudinal direction of the vehicle in order for it to be stowed in a rear compartment of the vehicle. The roof covering moves substantially parallel to the area of the roof opening along lateral guide rails provided in side struts. After the roof is fully opened in the manner of a convertible and the roof covering is stored in the roof cassette, the side struts can also be removed manually, at least in the section above the front vehicle seats, and stowed in the vehicle. As an alternative, the side struts can be connected to the vehicle by means of a corresponding four-bar linkage in such a manner that they can be pivoted and can come to lie on the belt line of the vehicle or thereunder to the sides of the rear seats.

Against this background, the object of the present invention is to further optimize a vehicle roof of the previously described type to the effect that it causes only very slight travelling noises ("wind or grumbling noises"), if any at all, in particular even in the event of a (small) partially open position while underway and in the event of the opening movement while underway and, while having a structurally simple construction, meets the most exacting requirements with regard to the sealing in the closed position.

This object is achieved according to the invention by a vehicle roof with the features of patent claim 1.

According thereto, a vehicle roof is provided, with a roof opening and with a roof covering having a roof tip pointing to the front of the vehicle and a roof end pointing to the rear of the vehicle, said roof covering being movable along guide tracks, which run on both sides of the roof opening, from a closed position closing the roof opening into an open position at least partially opening up the roof opening, wherein the opening movement from the closed position of the roof covering begins with a movement of the roof end into a lowered position below the roof opening.

An essential aspect of the invention is that, at the beginning of the opening operation from the closed position, the rear region of the roof covering moves downward with respect to the roof opening into a (further) lowered position below the roof opening before the roof covering executes the translatory opening movement toward the rear of the vehicle. In this position (to be regarded as the initial opening for the opening movement, the roof end opens up a substantially vertical opening gap, which can be defined in accordance with requirements, in relation to the rear roof region. This advantageously results in a ventilation position which is entirely desirable in terms of operation and in which the roof covering is still kept in the tensioned state by the roof tip (still) being locked in the front region of the vehicle and the roof end (still) remaining at a constant distance from the roof tip. This tensioning of the roof covering enables wind noises to be particularly substantially avoided.

However, even during more extensive opening, in which, after the roof tip is released, the roof covering can be successively released, roof covering folds which may possibly therefore arise because of the slackening tension of the roof covering do not result in annoying wind noises because the roof covering as a whole, or at least a substantial part thereof, can be situated below the roof opening by means of the lowering of the roof end.

Advantageous refinements and improvements of the vehicle roof indicated in patent claim 1 are found in the subclaims and the adjoining description of the drawings.

According to a structurally preferred development of the invention, each guide track has a rear end which, in the closed position of the roof covering, is movable downward in order to move the roof end into the lowered position with respect to the roof opening. In this case, the guide track can be a flexible design, for example at least in the region of its rear end, such that the lowering movement of the roof covering, which movement brings about the lowering of the roof end, is restricted to the rear region of said guide track.

In order only to have to move sections of the guide tracks, an advantageous refinement of the invention provides that the rear ends of the guide tracks are located in the region of the rear border of the roof opening, and that a respective guide track mounted on the vehicle adjoins a transfer point there. Therefore, that section of the entire guide of the roof covering (in particular of the guide into the final stowage position) which is to be moved remains limited to the section in the vicinity of the roof opening.

A refinement of the vehicle roof according to the invention that can be realized in a structurally simple manner and is particularly preferred consists in that each guide track is pivotable about a pivot point which, in the closed position, is situated in front of the roof end, as seen in the direction of the vehicle. Therefore, in a further preferred structural refinement, each guide track can be formed, for example, in a pivotable guide rail. The guide rail can be pivotable about a front joint through the angle which realizes the desired and appropriate lowering of the guide track at its rear end, for example in order, at the previously described transfer point, to precisely realize the necessary lowering with which the roof covering, during the further opening movement, can then be slid out of the rear ends of the guide tracks into the adjoining guide tracks mounted on the vehicle.

In order to open up the vehicle roof as fully as possible at least in the region of the passenger seats, there is frequently the requirement to also completely remove the supports which laterally surround the roof opening (side struts). For this purpose, a preferred development of the invention provides that the guide tracks are formed on supports which can be removed when the roof is fully open, and that, in the removed state, the guide tracks are prestressed into the position and/or are locked in the position which they take up in the fitted state in the lowered position of the roof end. This has the advantage that, when reinstalling the supports in order to subsequently close the vehicle roof, alignment of guide tracks on the vehicle with the guide tracks of the supports is ensured with little effort.

For this purpose, the guide tracks can be pressed into the desired position, for example by means of spring prestressing or spring force. It is also conceivable, after the opening operation of the vehicle roof, to hold the guide tracks in the desired position by means of spring-loaded locking elements.

In conjunction with the present invention, the term roof covering can be broadly interpreted; in particular, it is not restricted to a folding roof comprising one or more fabric webs, but rather can refer, for example, also to a roof covering composed of a multiplicity of individual louvers or to a roof covering comprising a plurality of wider roof elements.

An exemplary embodiment of the present invention is explained in more detail below with reference to a drawing, in which.

In the figures of the drawing, the same reference numbers refer to identical or functionally identical components and elements unless stated to the contrary.

The vehicle roof which is illustrated schematically in FIG. 1 to 6 is configured symmetrically with respect to the longitudinal axis of the vehicle, thus rendering an explanation of the opposite side of the vehicle roof or vehicle superfluous.

Figure 1:
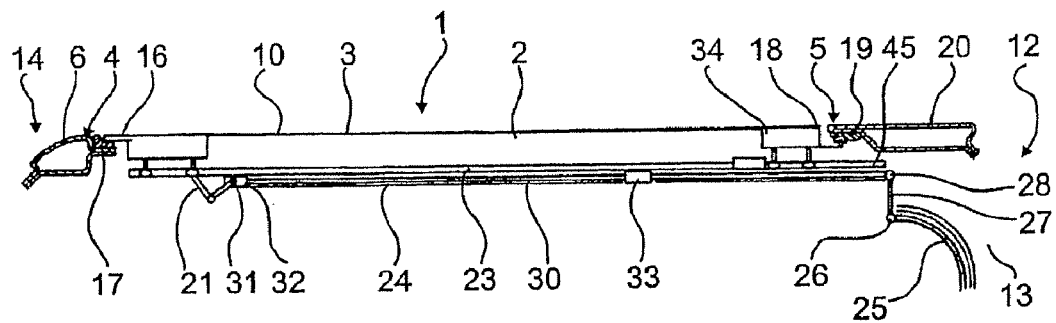
FIG. 1-6 show, in longitudinal section, various phases during the transfer of a fully closed vehicle roof into a fully open position.

FIG. 1 shows a vehicle roof arrangement 1 in a fully closed position. A roof opening 2 is bounded laterally by supports (only one lateral support 3 can be seen in FIG. 1 by way of an outline because of the longitudinal sectional illustration) and on the front side and rear side by respective borders 4 and 5. A wind cowl 6 is provided on the border 4. In the situation shown in FIG. 1, the roof opening 2 is fully covered or closed by a roof covering 10. The roof covering is a fabric folding roof which—as explained in more detail below—is partially or completely movable into a storage compartment 13 provided in the region of the vehicle rear 12. In the closed position, the roof covering 10 rests with its roof tip 16, which points to the front 14 of the vehicle and runs substantially parallel to the border 4, on an inner seal 17. The roof end 18, which points to the rear of the vehicle, of the roof covering 10 is pressed from below against a sealing lip 19 of a rear seal which is formed in a crossmember or roll bar 20.

The roof tip 16 is locked in relation to the vehicle body by means of a toggle lever mechanism (only illustrated by way of an outline). A multiplicity of suitable locking mechanisms as such are known from the construction of motor vehicles bodies or from the construction of folding convertible tops and can basically be constructed, for example, as described in DE 102 03 204 A1.

The locking takes place by means of a toggle lever 21 via which the roof tip 16 is preferably locked in the side supports (side struts) 3. Locking or tensioning forces are therefore not introduced into the front region of the vehicle body. In addition, this affords the advantages that the vehicle roof arrangement and the roof mechanism can be fully tested without the presence of the vehicle body and that the operation of the vehicle roof is independent of any tolerances on the vehicle body.

Figure 7:
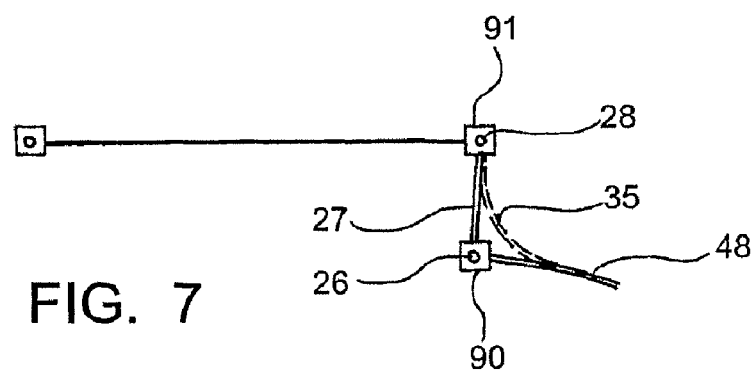
FIG. 7 shows a cutout from FIG. 1.

The roof covering 10 is movable in a manner described in more detail below along guide tracks 23 running on both sides of the roof opening 2. A pressure-resistant driving cable 25 which is fastened to a first point of articulation 26 of a lever 27, described in more detail with reference to FIG. 7, is used for the automatic opening and for the closing of the roof opening. A further pressure-resistant driving cable 30, also referred to as a distance cable, which leads to a point of articulation 31 of the toggle lever 21 is articulated on a further point of articulation 28 of the lever. The cable 30 is guided in a guide groove 24 in the support 3 below the guide track 23. A front locking block slider 32 is connected fixedly to the cable 30. A second, rear locking block slider 33 is disengaged from a rear locking rocker 34, which is also referred to as a locking block driver and which is connected fixedly to the roof end 18.

Figure 2:
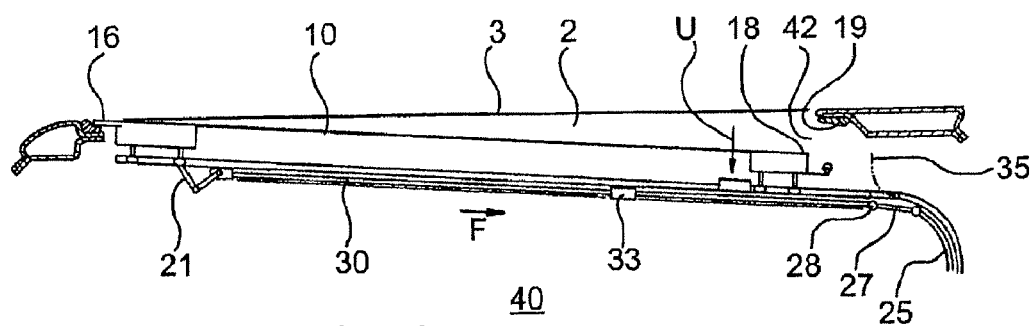

In the first phase (initial opening), which is shown in FIG. 2, of the vehicle roof movement, the roof tip 16 is still locked to the side struts (for example 3) via the toggle levers 21. The driving cable 25 has exerted a tensile force on the roof cover 10 and on the distance cable 30, said tensile force acting in the direction F and by means of which the lever 27 is pivoted from its substantially vertical orientation in the closed position (FIG. 1) into the approximately horizontal orientation apparent in FIG. 2. The point of articulation 28 is therefore moved downward along a guide track 35, as explained in more detail below in conjunction with FIG. 7. As a result, the roof end 18 has moved away from the roof opening 2 and the sealing lip 19 downward in the arrow direction U toward the passenger compartment 40. An opening gap 42 is therefore formed between the sealing lip 19 or the roll bar 20 and the roof covering 10 such that an entirely desirable "ventilation position" arises. In this case, an exchange of air between the passenger compartment 40 and the outside world is ensured without a horizontal roof opening, with the roof covering 10 continuing to be tensioned. This tensioning results from the continued locking of the roof tip 16 and from the tensile stress of the driving cable 25 in the direction F, as a result of which the roof end remains at a constant distance from the roof tip.

Upon further movement of the driving cable 25 or 30 in the direction F (FIG. 3), the rear locking block slider 33 moves in the direction of the roof end 18 which is guided by sliders 50, 51 (only shown by way of an outline) in the guide track 23.

Figure 3:
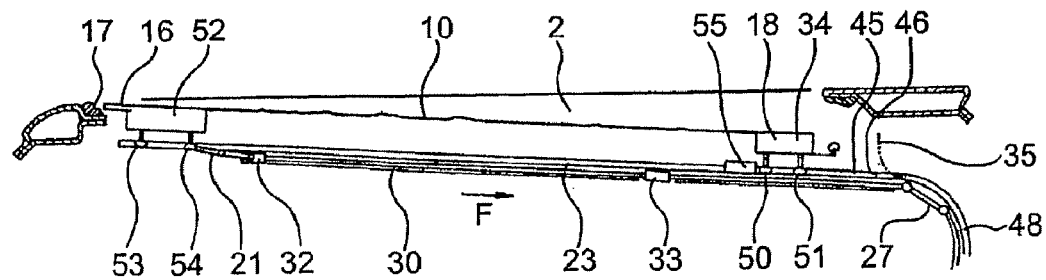

The roof tip is connected fixedly to a locking rocker 52 which has sliders 53, 54 which are movable in the guide track. By means of the tensile force of the driving cable 25 or of the distance cable 30, the front locking block slider 32 is also moved toward the rear of the vehicle and therefore stretches the toggle lever 21 such that the roof tip is released and is detached from the seal 17. The resultant, relaxed state of the roof covering 10 is also referred to as the "released roof covering". By contrast, the roof end is still located in a position, locked via the locking rocker 34, against a stop 55 such that, during further movement of the driving cable 25 and of the front locking block slider 32, a defined relaxation occurs, indicated in FIG. 3 by a slight undulation of the roof covering 10. FIG. 3 shows the situation in which the rear locking slider 33 is shortly before engagement with the locking rocker 34. The distance of the front locking slider 32 from the rear locking slider 33 is constant because the two locking sliders are connected fixedly to the driving cable or distance cable 30.

After the rear locking block slider 33 is retracted into the locking rocker 34 and the latter has been released from the stop or the lock 55 (FIG. 4), the roof end 18 is also moved toward the rear 12 of the vehicle. The roof covering 10 continues to relax in the process, to be precise by the amount of length which is fixed in the stretched position by the dimensioning of the toggle lever 21 and of the travel of the rear locking block slider 33 until the locking rocker 34 is released and carried along. Accordingly, FIG. 4 shows a relaxed contour of the roof covering 10, with the roof covering 10 being guided by roof bows which are shown only by way of outline and by way of example (44), run transversely and likewise move in the guide tracks 23.

In the position of the guide track 23 that is shown in FIG. 2 et seq., the rear end 45 of said guide track is aligned at a transition point 46 with the open end of a further guide track 48 mounted on the vehicle body. The transfer point 46 is located in the region of the rear border 5 of the roof opening 2.

Figure 4:
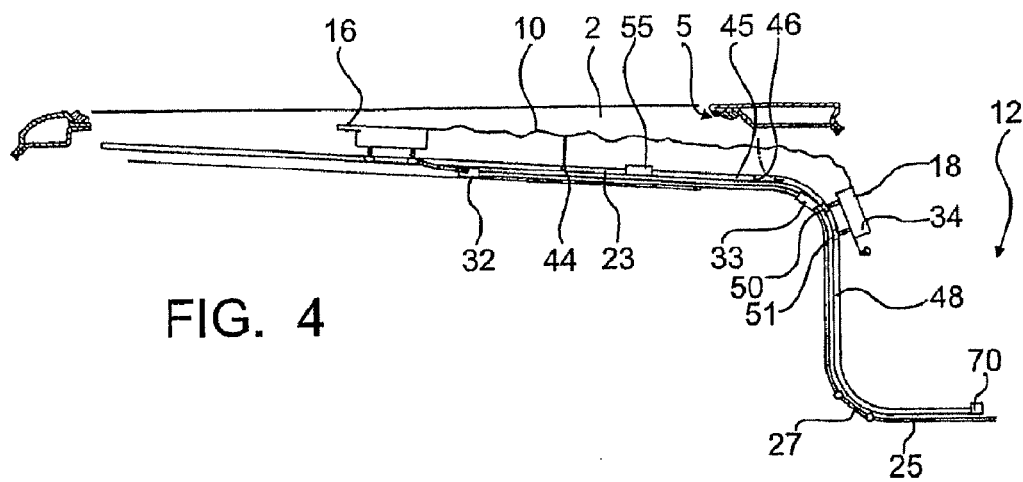

As shown in FIG. 4, the roof end 18 moves in the meantime by means of the guide sliders 50, 51 along the guide track 48 on the vehicle while the roof tip 16 correspondingly follows. By means of the now constant distance of roof tip 16 from roof end 18, an enveloping contour which is additionally ensured by the roof bows is also produced during this movement and the displacement of the roof covering 10, as a result of which a collision-free displacement of the roof covering in the direction of the rear of the vehicle is ensured.

Figure 5:
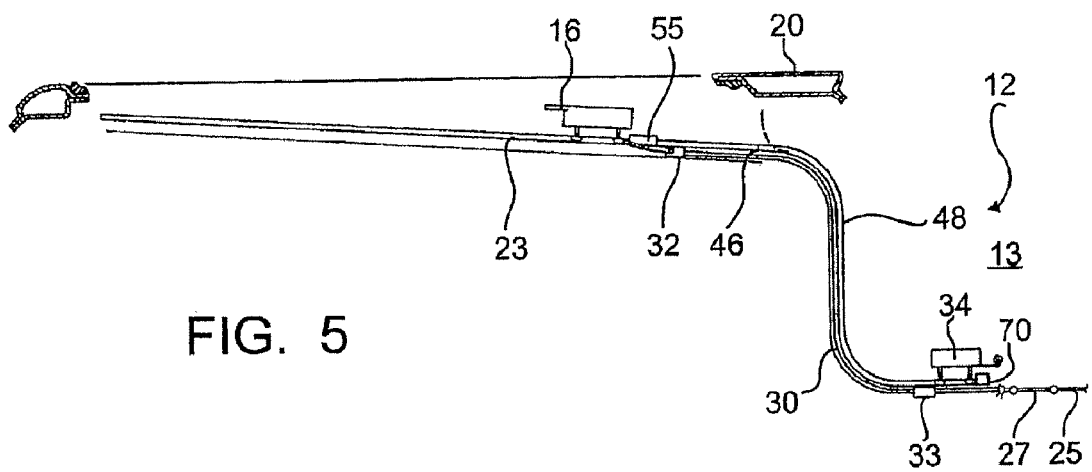

FIG. 5 shows the state in which the roof tip 16 is in shortly before leaving the guide track 23 in order to transfer at the transfer point 46 into the guide track 48. To simplify the illustration, the roof covering 10 is not shown in FIG. 5. The roof end 18 has reached a stop 70 provided in the rear 12 of the vehicle. By means of a rocker mechanism which is known per se, the rear locking block slider 33 is disengaged from the locking rocker 34. The locking slider 33 therefore continues to move in the direction of the rear of the vehicle without carrying along the roof end further when the driving cable 25 is appropriately further tensioned.

Figure 6:
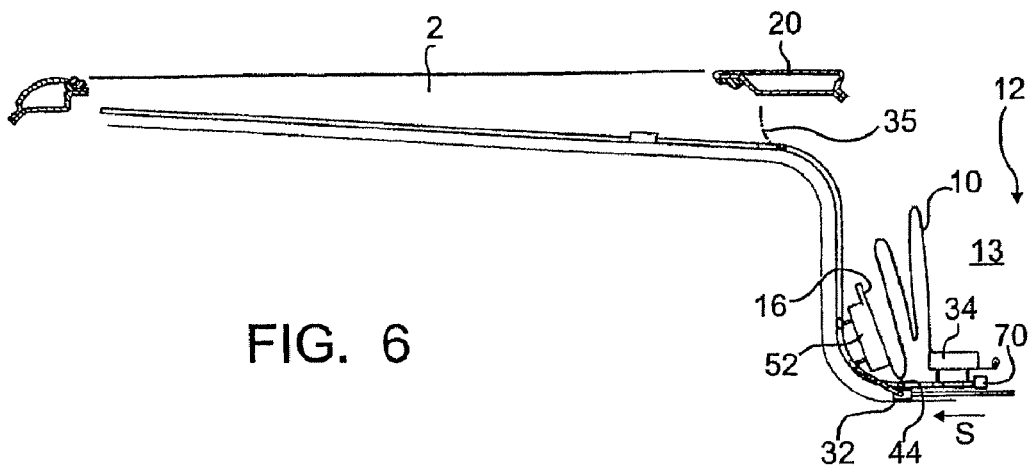

In the state shown in FIG. 6, the roof tip 16 has also reached its end position in which (if appropriate assisted by roof bows 44 illustrated by way of an outline) a space-saving, compact folding of the roof covering is realized. The roof opening 2 is therefore fully opened up (complete opening position). The front locking block slider 32 can then also be disengaged from the roof tip 16 or the front locking rocker. The roof bows 44 can be guided in the guide track 48 or in a guide track branching off before the final position is reached.

To re-close the roof opening 2, the driving cable 25 is moved in the arrow direction S and therefore exerts a compressive force on the locking block sliders 32, 33. The closing operation takes place in series reverse sequence to the previously described opening operation, with the locking block slider 32 first of all locking to the locking rocker 52 of the roof tip 16 and the roof tip then moving in the direction of the front 14 of the vehicle. The roof covering 10 is subsequently deployed until the rear locking block slider 33 comes into engagement with the locking rocker 34 and then the roof end is also moved back into the closed position. To finish the closing movement, the lever 27 is brought again into the vertical on account of the compressive force acting on the point of articulation 26 (FIG. 1), as a result of which the roof end 18 lifts vertically upward and finally comes again into contact with the sealing lip 19. In this case, the driving cable 25 can be designed as a pressure-resistant strand which is provided with an external thread, the external thread meshing with a driving pinion of a driving motor (not illustrated specifically). As a result, the respective compressing or tensioning movement is imparted to the driving cable.

FIG. 7 shows, for the purpose of further clarification, a cutout from FIG. 1, in which the lever 27 is illustrated in more detail. At its points of articulation 26 and 28, the lever 27 has guide sliders 90, 91, the guide slider 90 moving along the guide track 35 and the guide slider 91 moving along the guide track 48. As already explained, during tensile loading of the driving cable to the right, the point of articulation 26 is guided along the guide track 48. The lever 27 rotates about a virtual pivot point because the point of articulation 28 is at the same time inevitably guided downward along the guide track 35 (guided by means of the guide slider 91). The guide track 35 is arranged in a spatially offset plane in relation to the guide track 48.

Figure 8:
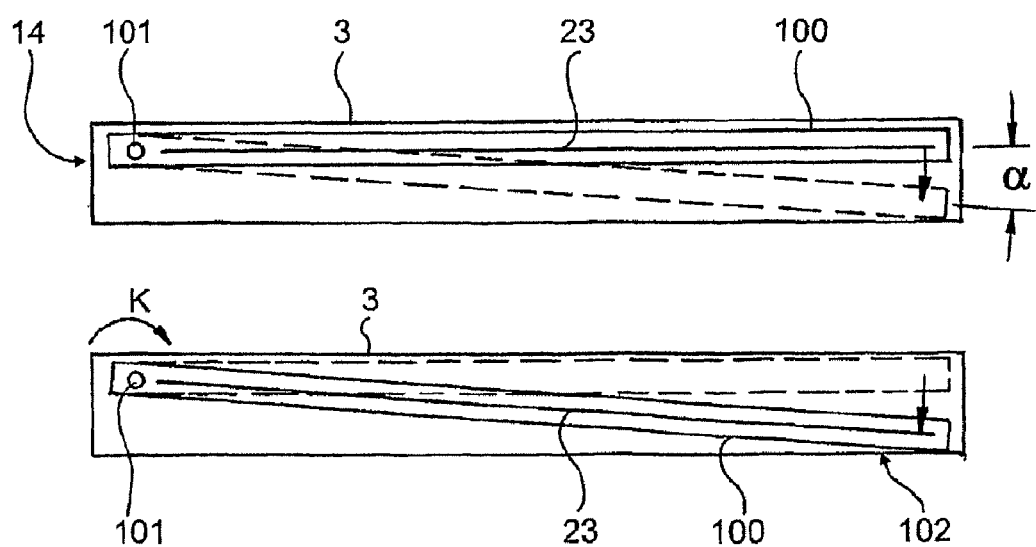
FIG. 8 shows a guide track.

FIG. 8 finally shows, in principle and schematically, one possibility of configuring a guide track 23. The guide track 23 is formed in a pivotable guide rail 100 which can be arranged on the support 3. In the situation illustrated at the top in FIG. 8, the guide rail 100 and therefore the guide track 23 are located in the closed position (cf. FIG. 1) in which the roof end bears in a sealing manner against the lip. The guide rail 100 and therefore the guide track 23 can be pivoted through an angle α about a pivot point 101. The pivot point 101 lies at a distance from the roof end in the region of the front 14 of the vehicle, preferably at the front end of the guide track 23.

The pivoted position of the guide rail 100 that is shown in the bottom part of FIG. 8 may be a preferred position 102 which is brought about, for example, by a spring force K acting in the clockwise direction about the pivot point 101. It is also possible to lock the preferred position 102 of the guide rail 100 by, for example, a spring-loaded ball which is guided in the support 3 latching into a corresponding rear recess of the rail 100. The prestressing into the preferred position 102 or locking therein is advantageous in particular if, after complete opening of the roof covering, the support 3 is to be removed or pivoted manually or in an automated manner (removed position), in order, during a subsequent re-installation of the support 3, to ensure a suitable orientation in advance of the guide track 23 with respect to the guide tracks mounted on the vehicle.

The invention claimed is:
1. A vehicle roof, comprising:
a roof opening;
guide tracks on opposite sides of the roof opening, each guide track having a forward portion and a rearward portion; and a roof covering having a roof tip pointing to the front of the vehicle and a roof end pointing to the rear of the vehicle, said roof covering being movable along the guide tracks from a closed position closing the roof opening into an open position at least partially opening up the roof opening, the forward and rearward portions being vertically offset in the closed position, wherein the roof is configured so that the opening movement from the closed position of the roof covering begins with a movement of the roof end into a lowered position below the roof opening while simultaneously vertically aligning the forward portions of the guide tracks with the rearward portions of the guide tracks for moving the roof covering along the guide tracks.

2. The vehicle roof of claim 1, characterized in that each forward portion of the guide track has a rear end which, in the closed position of the roof covering, is movable downward for the movement of the roof end into the lowered position with respect to the roof opening.

3. The vehicle roof of claim 2, characterized in that the rear ends of the forward portions of the guide tracks are located in the region of a rear border of the roof opening, and in that a respective transition guide track mounted on the vehicle adjoins a transfer point there.

4. The vehicle roof of claim 1 characterized in that each forward portion of the guide track is pivotable about a pivot point which, in the closed position, is situated in front of a roof end, as seen in the direction of the vehicle.

5. The vehicle roof of claim 4, characterized in that each guide track is formed in a pivotable guide rail.

6. The vehicle roof of claim 1 characterized in that the roof covering is designed as a folding roof which can be at least partially retracted into a storage compartment provided in the rear of the vehicle.

7. The vehicle of claim 1 wherein the roof covering is a foldable fabric.

8. The vehicle of claim 1 wherein the front and rearward portions of each guide track is connected to each other by a rotating lever that extends generally vertical when the roof covering is in a closed position and extends generally horizontal to permit the roof covering to move from the front portions to the rearward portions of the guide tracks.

* * * * *